(12) United States Patent
Chikugo

(10) Patent No.: US 6,861,662 B2
(45) Date of Patent: Mar. 1, 2005

(54) IMAGE INFORMATION READING APPARATUS

(75) Inventor: Hiroshi Chikugo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 39 days.

(21) Appl. No.: 10/342,258

(22) Filed: Jan. 15, 2003

(65) Prior Publication Data
US 2003/0132407 A1 Jul. 17, 2003

(30) Foreign Application Priority Data
Jan. 17, 2002 (JP) ....................................... 2002-008318

(51) Int. Cl.$^7$ ............................................. G03B 42/08
(52) U.S. Cl. ....................................... 250/589; 250/556
(58) Field of Search ............................... 250/484, 581, 250/582, 583, 584, 585, 586, 587, 588, 589, 590, 591

(56) References Cited

U.S. PATENT DOCUMENTS

| | | | | |
|---|---|---|---|---|
| 4,827,128 A | * | 5/1989 | Nakajima | .................... 250/582 |
| 4,831,461 A | * | 5/1989 | Ohta et al. | ................... 358/296 |
| 4,880,987 A | * | 11/1989 | Hosoi et al. | .............. 250/484.4 |
| 4,996,542 A | * | 2/1991 | Ohgoda et al. | ............. 347/262 |
| 6,365,909 B1 | * | 4/2002 | Hayakawa et al. | ......... 250/584 |
| 6,388,266 B1 | * | 5/2002 | Muller | ........................ 250/588 |
| 2001/0006221 A1 | * | 7/2001 | Gebele et al. | .............. 250/584 |
| 2001/0017357 A1 | * | 8/2001 | Chikugo | ..................... 250/589 |

FOREIGN PATENT DOCUMENTS

JP  2001-133919 A  5/2001

* cited by examiner

Primary Examiner—David Porta
Assistant Examiner—Faye Polyzos
(74) Attorney, Agent, or Firm—Sughrue Mion PLLC

(57) ABSTRACT

A reading unit has a scanner unit including a stimulating system, a CCD line sensor, and a position restricting mechanism, which are integrally mounted on a scanner head. The position restricting mechanism has first rubber rollers disposed for rolling contact with a surface of a stimulable phosphor sheet, and a second rubber roller disposed for rolling contact with an opposite surface of the stimulable phosphor sheet. The first rubber rollers and the second rubber roller serve to position a reading line on the stimulable phosphor sheet.

17 Claims, 8 Drawing Sheets

IMAGE INFORMATION READING APPARATUS

BACKGROUND OF THE INVENTION

1. Field of the Invention

The present invention relates to an image information reading apparatus having a reading unit for applying stimulating light in a main direction to a stimulable phosphor sheet which stores the radiation image information of a subject recorded therein and reading, with a line sensor, light that is emitted from the stimulable phosphor sheet in response to the stimulating light applied thereto, and a scanning system for feeding the stimulable phosphor sheet relatively in an auxiliary direction which is substantially perpendicular to the main direction.

2. Description of the Related Art

There is known a system for reproducing the radiation image information of a subject such as a human body or the like on a photographic photosensitive medium or the like or displaying the radiation image information on a display unit such as a CRT (Cathode Ray Tube) or the like, using a stimulable phosphor which, when exposed to an applied radiation (X-rays, $\alpha$-rays, $\beta$-rays, $\gamma$-rays, electron beams, ultraviolet radiation, or the like), stores a part of the energy of the radiation, and, when subsequently exposed to applied stimulating light such as visible light, emits light in proportion to the intensity of the stored energy of the radiation.

Specifically, in the above known system, the radiation image information of a subject such as a human body or the like is temporarily stored in a stimulable phosphor sheet which comprises a stimulable phosphor layer in the form of a sheet, and then stimulating light such as a laser beam is applied to the stimulable phosphor sheet to cause the stimulable phosphor sheet to emit light representing the stored radiation image information. The emitted light is photoelectrically read to produce an image signal. Based on the image signal, the radiation image information of the subject is outputted (reproduced) as a visible image on a recording medium such as a photographic photosensitive medium or the like or a display unit such as a CRT or the like.

The system incorporates a reading unit having a stimulating system for applying stimulating light to the stimulable phosphor sheet and a light collecting system for photoelectrically reading light emitted from the stimulable phosphor sheet in order to scan the stimulable phosphor sheet two-dimensionally. The reading unit has a reading/erasing unit reciprocally movable in an auxiliary direction (auxiliary scanning direction) in confronting relation to the stimulable phosphor sheet, as disclosed in Japanese laid-open patent publication No. 2001-133919. The reading/erasing unit includes the stimulating system, a line sensor (the light collecting system) which comprises an array of photoelectric transducers such as CCDs (Charge-Coupled Devices) arranged in a main direction (main scanning direction), and an erasing device.

With the above arrangement, in order to accurately read the radiation image information carried on the stimulable phosphor sheet, it is necessary to accurately set the distance between the stimulating system and the stimulable phosphor sheet, and the distance between the line sensor and the stimulable phosphor sheet.

Specifically, if the distance between the stimulating system and the stimulable phosphor sheet varies while the radiation image information is read from the stimulable phosphor sheet, the stimulating light is brought out of focus on the stimulable phosphor sheet. The depth of field by the line sensor needs to be kept in a range of $\pm 100$ $\mu$m. If the distance between the line sensor and the stimulable phosphor sheet varies, then the depth of field varies, resulting in a failure to obtain the radiation image information of the subject with high accuracy. Even if the above distances do not vary, the overall quality of the reproduced image is lowered when the distances are too small or too large.

Therefore, it is necessary to individually increase the accuracy of the reading/erasing unit, the planarity accuracy of the reading/erasing unit in the auxiliary direction, and the planarity accuracy of the stimulable phosphor sheet. However, increasing the above accuracies tends to result in a substantial increase in the cost of the system, and the accuracies may possibly fail to be kept at a desired high level.

SUMMARY OF THE INVENTION

It is a primary object of the present invention to provide an image information reading apparatus which is capable of reading radiation image information highly accurately with a simple and inexpensive arrangement.

According to the present invention, an image information reading apparatus has a reading unit for applying stimulating light in a main direction to a stimulable phosphor sheet which stores the radiation image information of a subject recorded therein, and reading, with a line sensor, light which is emitted from the stimulable phosphor sheet in response to the stimulating light applied thereto. The reading unit has a position restricting mechanism which is positioned closely to a reading line along which the radiation image information recorded in the stimulable phosphor sheet is read by the line sensor. The position restricting mechanism is capable of supporting the stimulable phosphor sheet along the main direction.

With the above arrangement, the depth of field of the stimulable phosphor sheet along the reading line is maintained highly accurately in a desired range by the position restricting mechanism. The positioning accuracy tolerances for positioning the stimulable phosphor sheet itself in an auxiliary direction substantially perpendicular to the main direction may not be highly strict. The radiation image information recorded in the stimulable phosphor sheet an be read efficiently, and the position restricting mechanism can be simple in structure as it does not need to position the entire image information recording area of the stimulable phosphor sheet with high accuracy.

The position restricting mechanism comprises at least a roller or a guide member with a damping shoe. The roller or the guide member with the damping shoe is disposed on one surface or both surfaces of the stimulable phosphor sheet. The load imposed on the stimulable phosphor sheet is thus reduced, and any damage imposed on the stimulable phosphor sheet by the position restricting mechanism is minimized. The position restricting mechanism is simplified in structure and constructed economically.

The position restricting mechanism is made of a material more rigid than the stimulable phosphor sheet. The position restricting mechanism has a vibroisolating function to allow the recorded radiation image information to be read highly accurately from the stimulable phosphor sheet.

The image information reading apparatus further has a feed mechanism for feeding the reading unit in the auxiliary direction and a damper mechanism for resiliently supporting the stimulable phosphor sheet. The reading unit reads the recorded radiation image information from the stimulable phosphor sheet while moving in unison with the position restricting mechanism in the auxiliary direction. The reading line on the stimulable phosphor sheet can be positioned highly accurately without being affected by the rigidity of the stimulable phosphor sheet itself.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
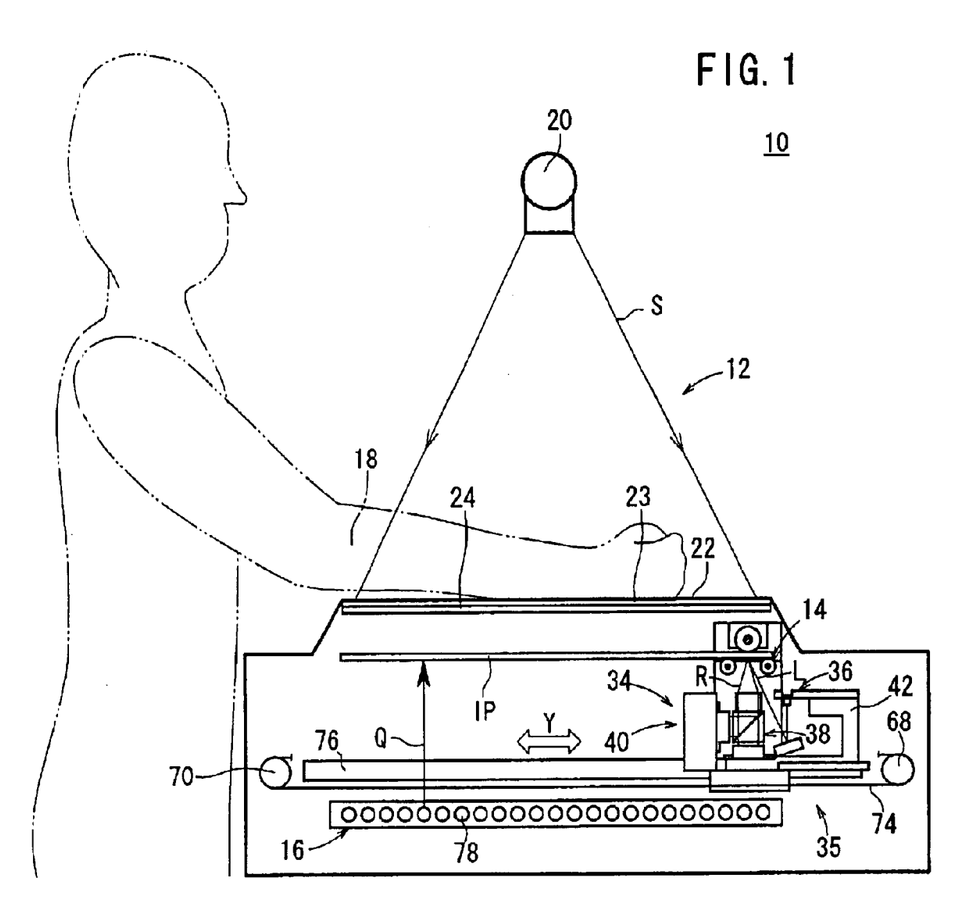
FIG. 1 is a schematic cross-sectional view of a radiation image information recording and reading apparatus according to a first embodiment of the present invention.

FIG. 1 shows in schematic cross section a radiation image information recording and reading apparatus (image information reading apparatus) 10 according to a first embodiment of the present invention.

As shown in FIG. 1, the radiation image information recording and reading apparatus 10 comprises a radiation recording unit 12 for temporarily recording the radiation image information of a subject 18 such as a human body or the like on a stimulable phosphor sheet IP, a reading unit 14 for applying stimulating light L such as a laser beam or the like to the stimulable phosphor sheet IP and photoelectrically reading light R that is emitted from the stimulable phosphor sheet IP depending on the radiation intensity of the recorded radiation image information, and an erasing light source 16 for discharging radiation energy that is left in the stimulable phosphor sheet IP.

Figure 2:
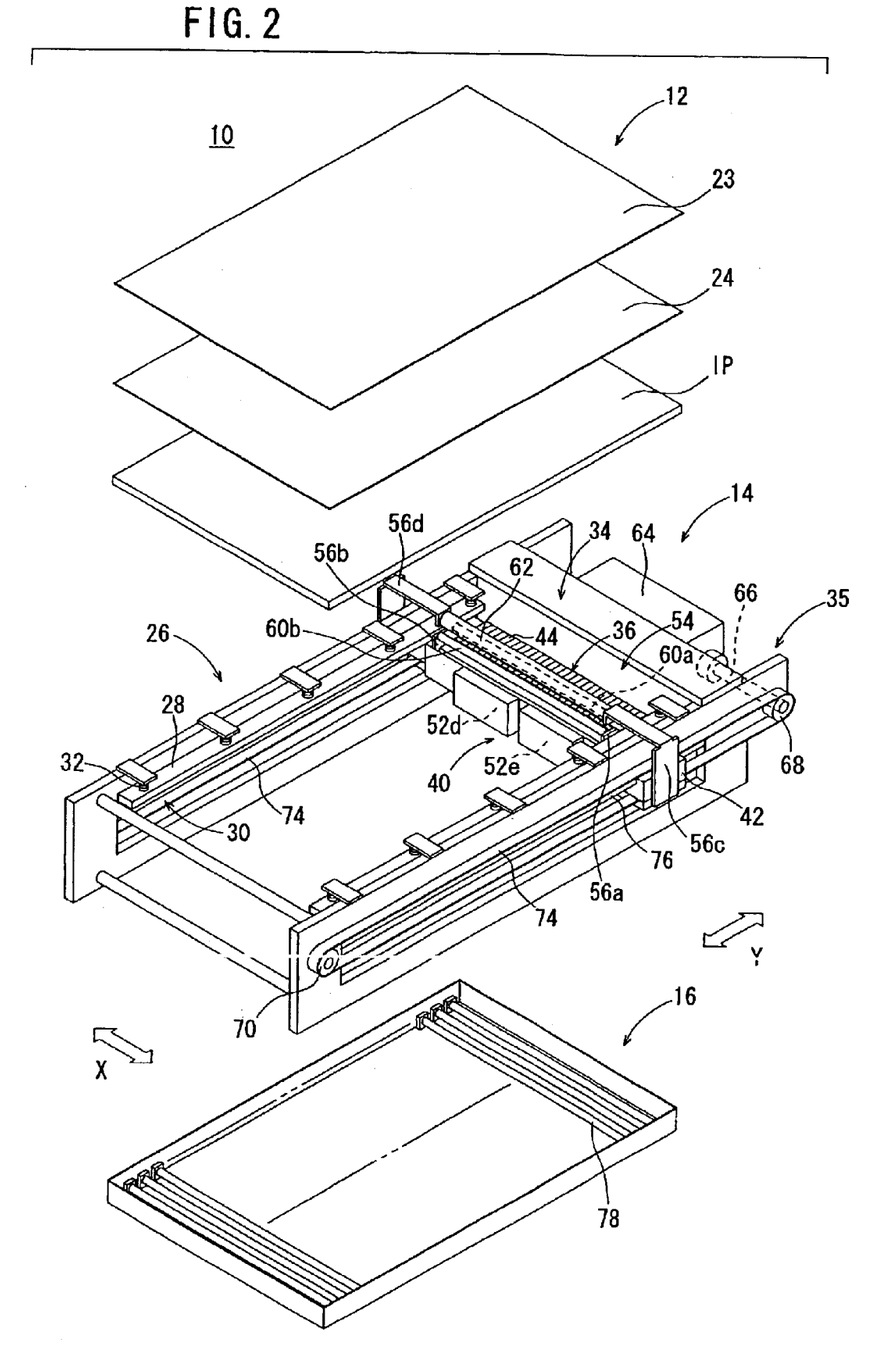
FIG. 2 is an exploded perspective view of an internal structure of the radiation image information recording and reading apparatus.

The radiation recording unit 12 has a radiation source 20 for generating a radiation S and a radiation-permeable imaging base 22 for holding the subject 18 in position thereon. As shown in FIGS. 1 and 2, a phototimer 23 and a grid 24 for removing scattered rays are disposed behind the imaging base 22. The stimulable phosphor sheet IP is held in a given imaging position by a securing unit 26 further behind the grid 24.

Figure 3:
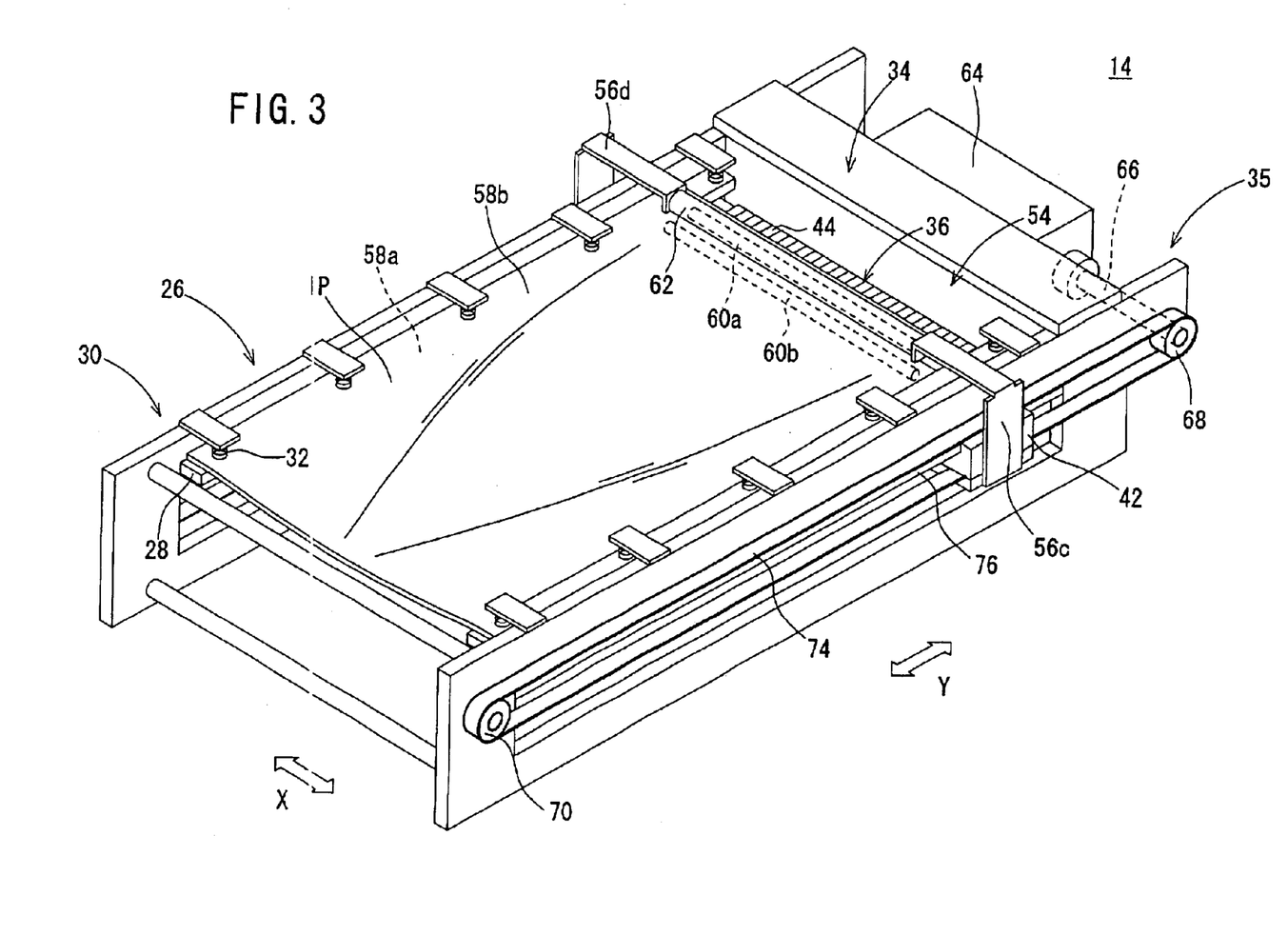
FIG. 3 is a perspective view of a reading unit of the radiation image information recording and reading apparatus.

As shown in FIGS. 2 and 3, the securing unit 26 has a pair of parallel receivers 28 extending in an auxiliary direction (indicated by the arrow Y) which is substantially perpendicular to a main direction (indicated by the arrow X) in which a line beam of the stimulating light L extends as described later on. The receivers 28 are positioned respectively at the transversely opposite edges of the stimulable phosphor sheet IP which are spaced from each other in the main direction. The transversely opposite edges of the stimulable phosphor sheet IP are placed respectively on the upper surfaces of the receivers 28. The securing unit 26 also has a damper mechanism 30 comprising a plurality of spaced springs (resilient members) 32 located over the transversely opposite edges of the stimulable phosphor sheet IP which are supported on the upper surfaces of the receivers 28. The damper mechanism 30 may alternatively comprise a plurality of leaf springs, rubber members, or the like in place of the springs 32.

As shown in FIGS. 1 through 3, the reading unit 14 comprises a scanner unit 34 for reading the radiation image information carried by the stimulable phosphor sheet IP, and an auxiliary scanning system 38 for reciprocally moving the scanner unit 34 in the auxiliary direction.

The scanner unit 34 comprises a stimulating system 36 and a CCD line sensor (light collecting system) 40 having a condensing lens array 38. The stimulating system 36, the condensing lens array 38, and the CCD line sensor 40 extend in the main direction and are mounted on a scanner head 42.

Figure 4:
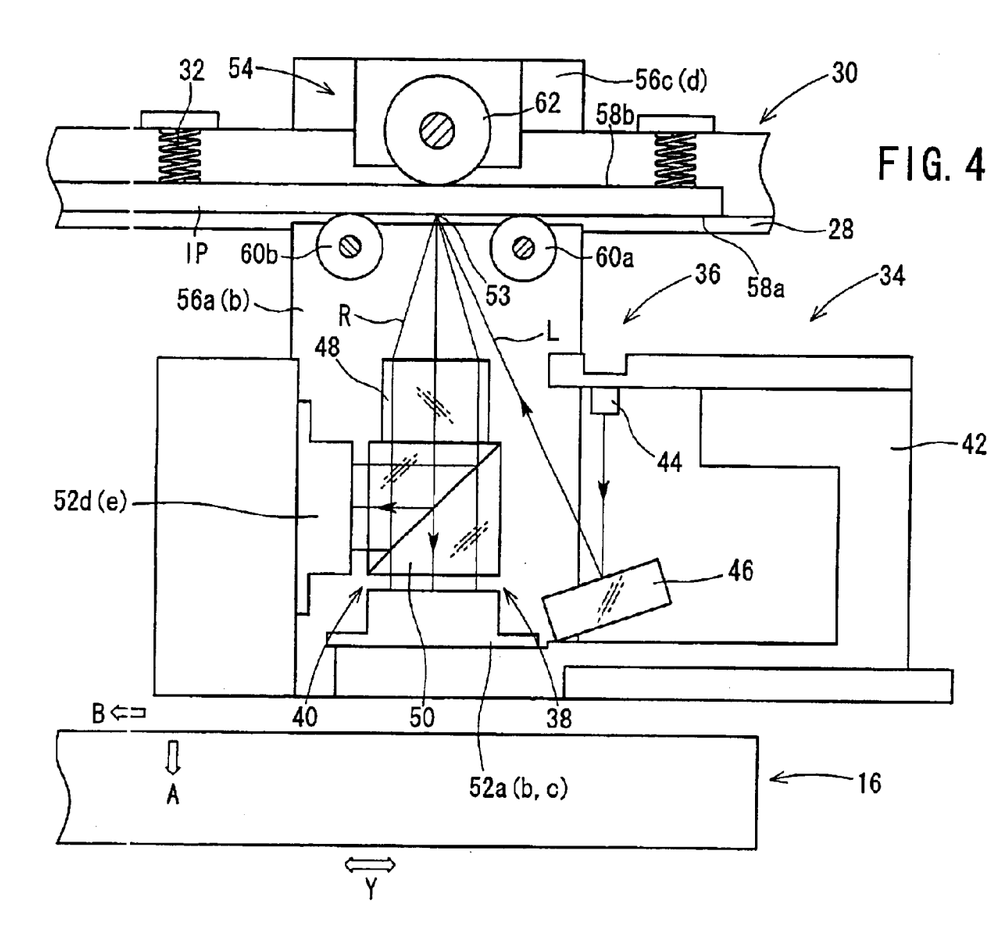
FIG. 4 is an elevational view of the reading unit.

As shown in FIGS. 2 and 4, the stimulating system 36 has an array of laser diodes 44 arranged in the main direction. The laser diodes 44 have stimulating light emission surfaces facing downwardly away from the stimulable phosphor sheet IP. Stimulating light emitted as scattering light from the laser diodes 44 is reflected by a cylindrical mirror 46, and is applied as a line beam of stimulating light L to the stimulable phosphor sheet IP.

As shown in FIG. 4, the condensing lens array 38 comprises a cylindrical lens 48 mounted on the scanner head 42 and extending in the main direction, for converging light R emitted from the stimulable phosphor sheet IP, and a prism 50 disposed closely below the cylindrical lens 48, for dividing the light R into a ray of light traveling in the direction (downward direction) indicated by the arrow A and a ray of light traveling in the direction (horizontal direction) indicated by the arrow B. In FIGS. 2 and 3, the condensing lens array 38 is omitted from illustration in order to show the stimulating system 36 and the CCD line sensor 40.

The CCD line sensor 40 comprises five CCDs 52a through 52e. Of the five CCDs 52a through 52e, three CCDs 52a through 52c are disposed below the prism 50 at spaced intervals, and two CCDs 52d, 52e are disposed sideways of the prism 50 in respective positions aligned with the spaces between the CCDs 52a through 52c. The CCD 52d partly overlaps the CCDs 52a, 52b, and the CCD 52e partly overlaps the CCDs 52b, 52c as viewed in the transverse direction of the CCD line sensor 40.

The scanner head 42 has a position restricting mechanism 54 (see FIG. 4) which is positioned closely to a reading line 53 along which the radiation image information recorded in the stimulable phosphor sheet IP is read by the CCD line sensor 40. The position restricting mechanism 54 serves to support the stimulable phosphor sheet IP along the main direction.

As shown in FIG. 2, the position restricting mechanism 54 has a pair of attachments 56a, 56b spaced a predetermined distance inwardly from the opposite ends of the scanner head 42 in the main direction. As shown in FIGS. 2 through 4, first rubber rollers 60a, 60b which extend in the main direction are rotatably supported on the attachments 56a, 56b for rolling contact with a lower surface 58a of the stimulable phosphor sheet IP which is irradiated with the stimulating light L. The first rubber rollers 60a, 60b are positioned one on each side of the reading line 53 where the stimulating light L is applied to the stimulable phosphor sheet IP.

The position restricting mechanism 54 also has a pair of attachments 56c, 56d mounted on the opposite ends of the scanner head 42 in the main direction. The attachments 56c, 56d have respective ends projecting inwardly and positioned near the respective attachments 56a, 56b. A second rubber roller 62 which extends in the main direction is rotatably supported on the inwardly projecting ends of the attachments 56c, 56d for rolling contact with an upper surface 58b of the stimulable phosphor sheet IP which is irradiated with the radiation. The second rubber roller 62 is positioned in alignment with the reading line 53 where the stimulating light L is applied to the stimulable phosphor sheet IP.

The first and second rubber rollers 60a, 60b, 62 serve to position the reading line 53 on the stimulable phosphor sheet IP in alignment with the CCD line sensor 40 in the main direction for thereby keeping the depth of field in a range of ±100 μm. The first and second rubber rollers 60a, 60b, 62 are made of a material more rigid than the stimulable phosphor sheet IP. The first and second rubber rollers 60a, 60b, 62 may be replaced with elastomer rollers. Insofar as the depth of field can be maintained in the desired range, the first and second rubber rollers 60a, 60b, 62 may not be held in rolling contact with the opposite surfaces 58a, 58b of the stimulable phosphor sheet IP.

As shown in FIG. 3, the auxiliary scanning system 35 has a rotary actuator 64 disposed in one end of the radiation image information recording and reading apparatus 10 in the direction indicated by the arrow Y, a pair of drive pulleys 68 fixedly mounted on respective opposite ends of a rotatable shaft 66 extending from the rotary actuator 64 in the direction indicated by the arrow X, a pair of driven pulleys 70 spaced from the respective drive pulleys 68 in the direction indicated by the arrow Y, and a pair of belts 74 trained around the respective sets of the drive pulleys 68 and the driven pulleys 70. The scanner head 42 is fixed to the belts 74 and movably supported on a pair of guide rails 76 which extends in the direction indicated by the arrow Y (see FIG. 1).

The erasing light source 16 is positioned across the reading unit 14 from the stimulable phosphor sheet IP (see FIGS. 1 and 2). The erasing light source 16 applies erasing light Q to the stimulable phosphor sheet IP to discharge radiation energy remaining in the stimulable phosphor sheet IP. The erasing light source 16 comprises a plurality of fluorescent lamps 78 having a length greater than the width of the stimulable phosphor sheet IP (in the direction indicated by the arrow X) and arrayed in the longitudinal direction (indicated by the arrow Y) of the stimulable phosphor sheet IP. The fluorescent lamps 78 thus configured and arranged apply the erasing light Q to the entire image area of the stimulable phosphor sheet IP.

Operation of the radiation image information recording and reading apparatus 10 thus constructed according to the first embodiment of the present invention will be described below.

When the subject 18 such as a human body or the like is moved to the radiation recording unit 12 for recording radiation image information of the subject 18, an operator such as a doctor or the like who is handling the radiation image information recording and reading apparatus 10 carries out a recording position matching process by vertically moving the imaging base 22. Then, the subject 18 is placed on the imaging base 22, and the operator energizes the radiation source 20 to emit a radiation therefrom. The radiation emitted from the radiation source 20 passes through the subject 18 and reaches the stimulable phosphor sheet IP, recording the radiation image information of the subject 18 in the stimulable phosphor sheet IP.

After the radiation image information of the subject 18 is recorded in the stimulable phosphor sheet IP, the stimulating system 36 of the reading unit 14 is actuated, and the rotary actuator 64 of the auxiliary scanning system 35 is energized. In the stimulating system 36, the laser diodes 44 arrayed in the main direction (indicated by the arrow X) across the stimulable phosphor sheet IP are energized to output the stimulating light L which is reflected by the cylindrical mirror 46 and then applied to the stimulable phosphor sheet IP along the direction indicated by the arrow X.

When the rotary actuator 64 of the auxiliary scanning system 35 is energized, the rotatable shafts 66 rotate the drive pulleys 68, which drive the belts 74 trained around the drive and driven pulleys 68, 70 in circular motion, moving the scanner head 42 fixed to the belts 74 in the direction indicated by the arrow Y. The stimulable phosphor sheet IP which carries the recorded radiation image information is two-dimensionally scanned by the stimulating light L, and emits light R depending on the recorded radiation image information.

The emitted light R is applied through the condensing lens array 38 to the CCD line sensor 40. When the light R is applied to the CCDs 52a through 52e, they convert the light R into an electric signal, so that the CCD line sensor 40 photoelectrically reads the radiation image information recorded in the stimulable phosphor sheet IP.

Then, the fluorescent lamps 78 of the erasing light source 16 applies erasing light Q to the stimulable phosphor sheet IP from which the radiation image information has been read by the reading unit 14. In response to the applied erasing light Q, the stimulable phosphor sheet IP discharges remaining radiation energy therefrom. Thereafter, the stimulable phosphor sheet IP will be used to record radiation image information in a next cycle.

The stimulable phosphor sheet IP is supported at its transversely opposite edges in the main direction (indicated by the arrow X) by the parallel receivers 28 of the securing unit 26 which extend in the auxiliary direction (indicated by the arrow Y). Since the stimulable phosphor sheet IP is thus held in a horizontal attitude in the reading unit 14, the stimulable phosphor sheet IP tends to flex vertically by gravity along the direction indicated by the arrow X.

According to the first embodiment, the scanner head 42 has the position restricting mechanism 54 which is positioned closely to the reading line 53 on the stimulable phosphor sheet IP along which the radiation image information is read by the CCD line sensor 40. As shown in FIG. 4, the position restricting mechanism 54 has the first rubber rollers 60a, 60b extending in the main direction and disposed for rolling contact with the surface 58a of the stimulable phosphor sheet IP, and the second rubber roller 62 extending in the main direction and disposed for rolling contact with the surface 58b of the stimulable phosphor sheet IP, the second rubber roller 62 being positioned in alignment with the reading line 53.

Since the stimulable phosphor sheet IP is supported, i.e., positionally restricted, by the first rubber rollers 60a, 60b and the second rubber roller 62, the depth of field along the reading line 53 is kept highly accurately in the desired range. While the stimulable phosphor sheet IP is thus supported, the position restricting mechanism 54 moves in unison with the scanner head 42 in the auxiliary direction.

When the scanner unit 34 of the reading unit 14 reads the radiation image information recorded in the stimulable phosphor sheet IP while being fed by the auxiliary scanning system 35 in the auxiliary direction indicated by the arrow Y, the distance between the laser diodes 44 and the stimulable phosphor sheet IP and the distance between the CCDs 52a through 52e and the stimulable phosphor sheet IP are maintained in predetermined ranges. Accordingly, the stimulating light L is prevented from being brought out of focus on the stimulable phosphor sheet IP, and the efficiency with which the light R emitted from the stimulable phosphor sheet IP is collected by the CCDs 52a through 52e is prevented from being unduly varied. Furthermore, the laser diodes 44 and the CCDs 52a through 52e are prevented from being displaced unnecessarily toward the stimulable phosphor sheet IP and also from being spaced from their positions.

Therefore, the depth of field along the reading line 53 where the stimulable phosphor sheet IP is irradiated with the stimulating light L is reliably maintained in the range of ±100 μm, for example. As a result, the radiation image information recorded in the stimulable phosphor sheet IP can be read with high accuracy.

The entire surface of the stimulable phosphor sheet IP does not need to be positioned highly accurately with respect to the securing unit 26. Specifically, when the position restricting mechanism 54 integrally combined with the scanner head 42 moves in unison with the scanner head 42 in the auxiliary direction, only the area of the stimulable phosphor sheet IP which is irradiated with the stimulating light L, i.e., only the reading line 54, can be positioned highly accurately with respect to the securing unit 26. The position restricting mechanism 54 is thus effectively simplified in arrangement and hence economical.

The springs 32 of the damper mechanism 30 are disposed over the transversely opposite edges of the stimulable phosphor sheet IP. The reading line 53 on the stimulable phosphor sheet IP can be positioned reliably and easily without being affected by the rigidity of the stimulable phosphor sheet IP itself because the springs 32 allow the stimulable phosphor sheet IP to be displaced vertically when the reading line 53 on the stimulable phosphor sheet IP is positioned by the position restricting mechanism 54.

The use of the first and second rubber rollers 60a, 60b, 62 avoids damage to the stimulable phosphor sheet IP and hence increases the durability of the stimulable phosphor sheet IP. The first and second rubber rollers 60a, 60b, 62 are made of a material more rigid than the stimulable phosphor sheet IP. Consequently, the first and second rubber rollers 60a, 60b, 62 has a vibroisolating function to allow the recorded radiation image information to be read highly accurately from the stimulable phosphor sheet IP.

Therefore, according to the first embodiment, the position restricting mechanism 54 integrally combined with the scanner head 42 allows the recorded radiation image information to be read highly accurately and reliably from the stimulable phosphor sheet IP with a simple and economical arrangement.

Figure 5:
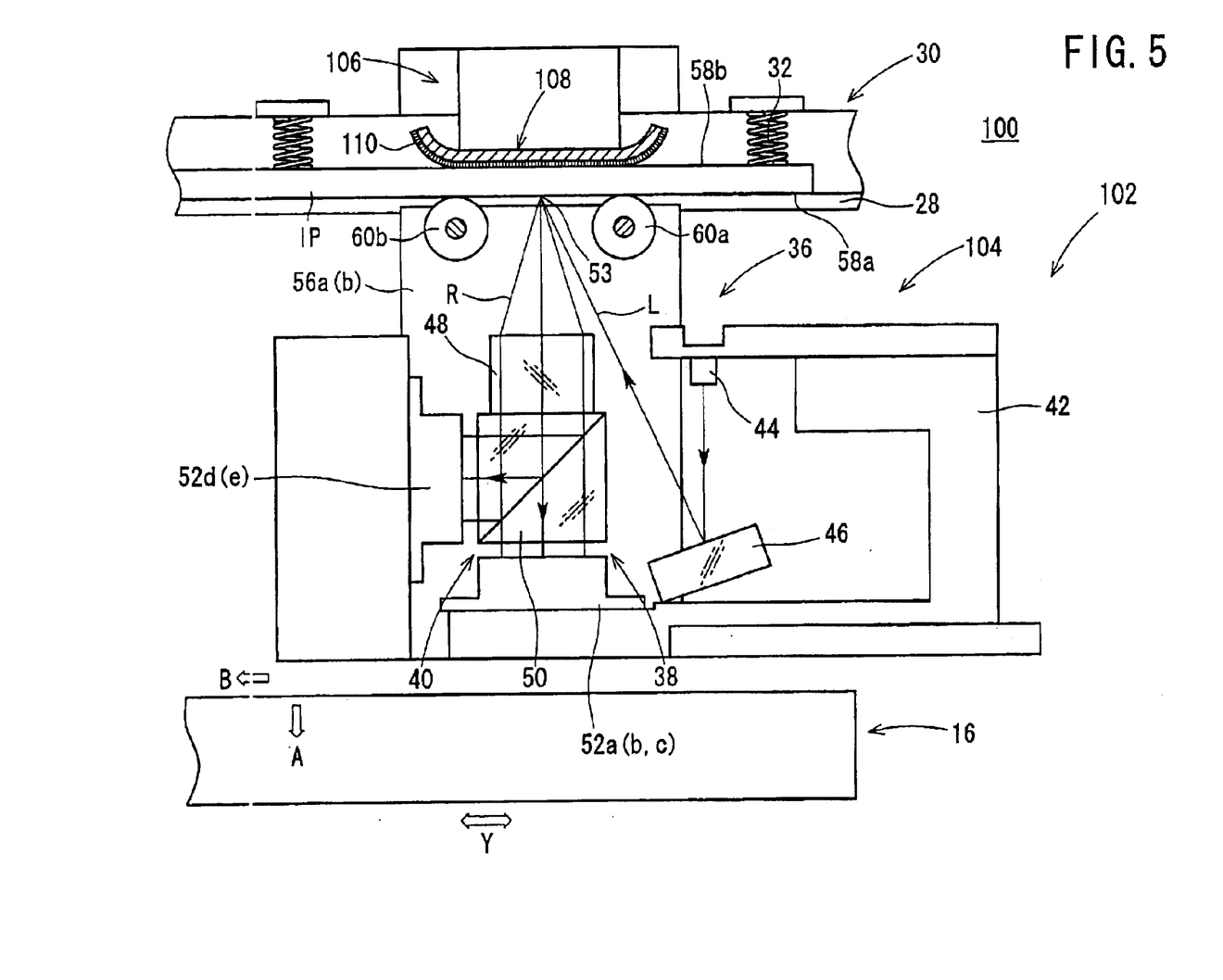
FIG. 5 is an elevational view of a reading unit of a radiation image information recording and reading apparatus according to a second embodiment of the present invention.

FIG. 5 shows in elevation a reading unit 102 of a radiation image information recording and reading apparatus (image information reading apparatus) 100 according to a second embodiment of the present invention. Those parts of the radiation image information recording and reading apparatus 100 which are identical to those of the radiation image information recording and reading apparatus 10 according to the first embodiment are denoted by identical reference characters, and will not be described in detail. Similarly, those parts of radiation image information recording and reading apparatus according to third through fifth embodiments, to be described later on, of the present invention which are identical to those of the radiation image information recording and reading apparatus 10 according to the first embodiment are denoted by identical reference characters, and will not be described in detail.

As shown in FIG. 5, the reading unit 102 has a scanner unit 104 including a scanner head 42 which has a position restricting mechanism 106. The position restricting mechanism 106 comprises first rubber rollers 60a, 60b disposed for rolling contact with the surface 58a of the stimulable phosphor sheet IP and a guide member 108 disposed for sliding contact with the surface 58b of the stimulable phosphor sheet IP.

The guide member 108 extends in the main direction, and has a damping shoe 110 positioned for sliding contact with the surface 58b of the stimulable phosphor sheet IP. The damping shoe 110 is made of a woven or non-woven fabric of polyester, for example, for preventing the stimulable phosphor sheet IP from being damaged by sliding contact of the damping shoe 110 with the stimulable phosphor sheet IP.

In the second embodiment, the first rubber rollers 60a, 60b and the guide member 108 jointly hold the stimulable phosphor sheet IP near its reading line 53, and the position restricting mechanism 106 moves in unison with the scanner head 42 in the auxiliary direction. The second embodiment thus offers the same advantages as with the first embodiment, i.e., keeps the reading line 53 on the stimulable phosphor sheet IP positioned highly accurately, maintains the depth of field reliably in the desired range, and reads the recorded radiation image information well from the stimulable phosphor sheet IP with a simple and economical arrangement.

In the second embodiment, the guide member 108 is used in place of the second rubber roller 62 of the first embodiment. The guide member 108 may instead be used in place of the first rubber roller 60a and/or the first rubber roller 60b.

Figure 6:
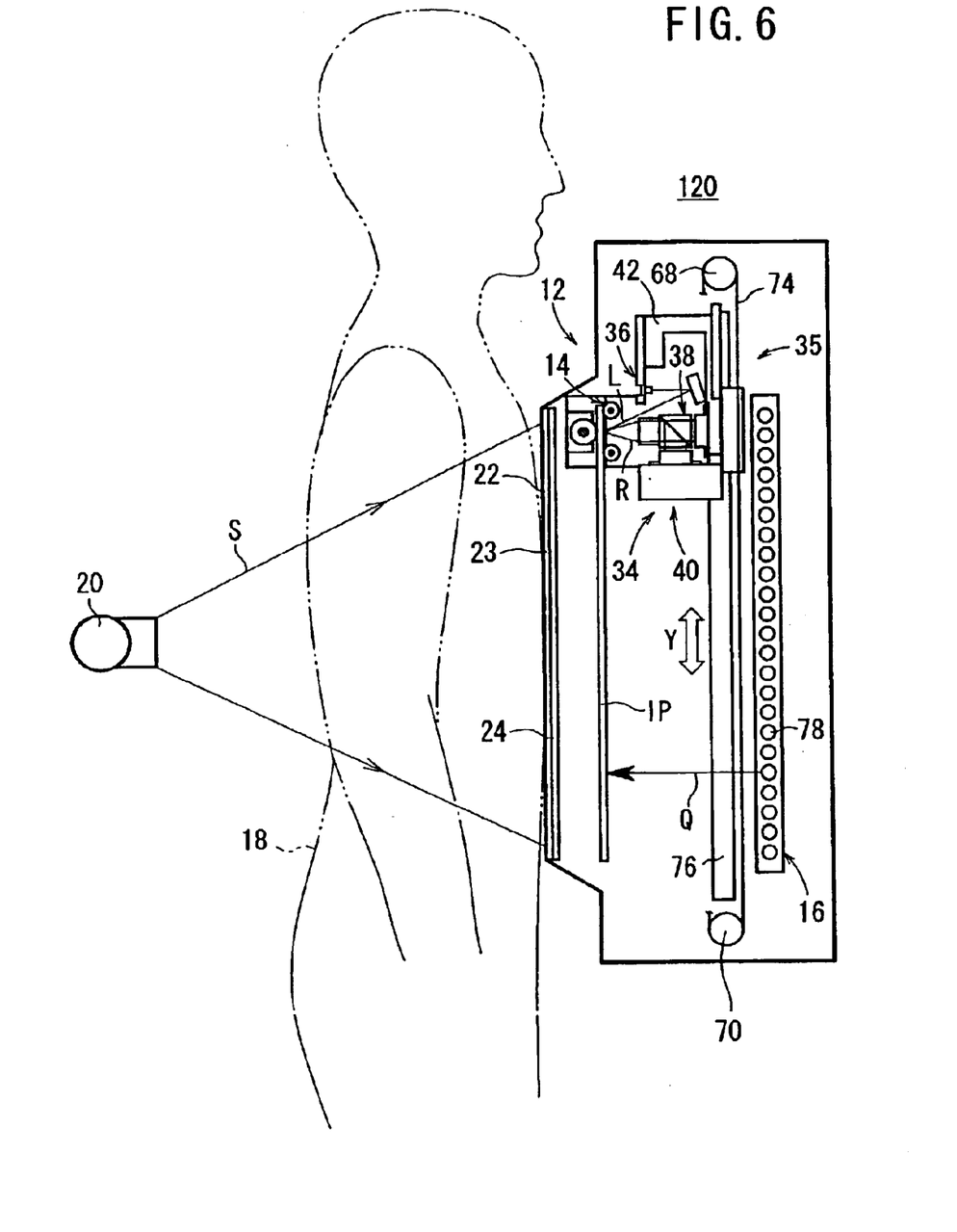
FIG. 6 is a schematic cross-sectional view of a radiation image information recording and reading apparatus according to a third embodiment of the present invention.

FIG. 6 shows in schematic cross section of a radiation image information recording and reading apparatus 120 according to a third embodiment of the present invention.

The radiation image information recording and reading apparatus 10, 100 according to the first and second embodiments are of a horizontal type in which the stimulable phosphor sheet IP is held in a horizontal attitude and the recorded radiation image information is read from the stimulable phosphor sheet IP in the horizontal attitude. According to the third embodiment, as shown in FIG. 6, the radiation image information recording and reading apparatus 120 is of a vertical type in which the stimulable phosphor sheet IP is held in a vertical attitude and the recorded radiation image information is read from the stimulable phosphor sheet IP in the vertical attitude.

Figure 7:
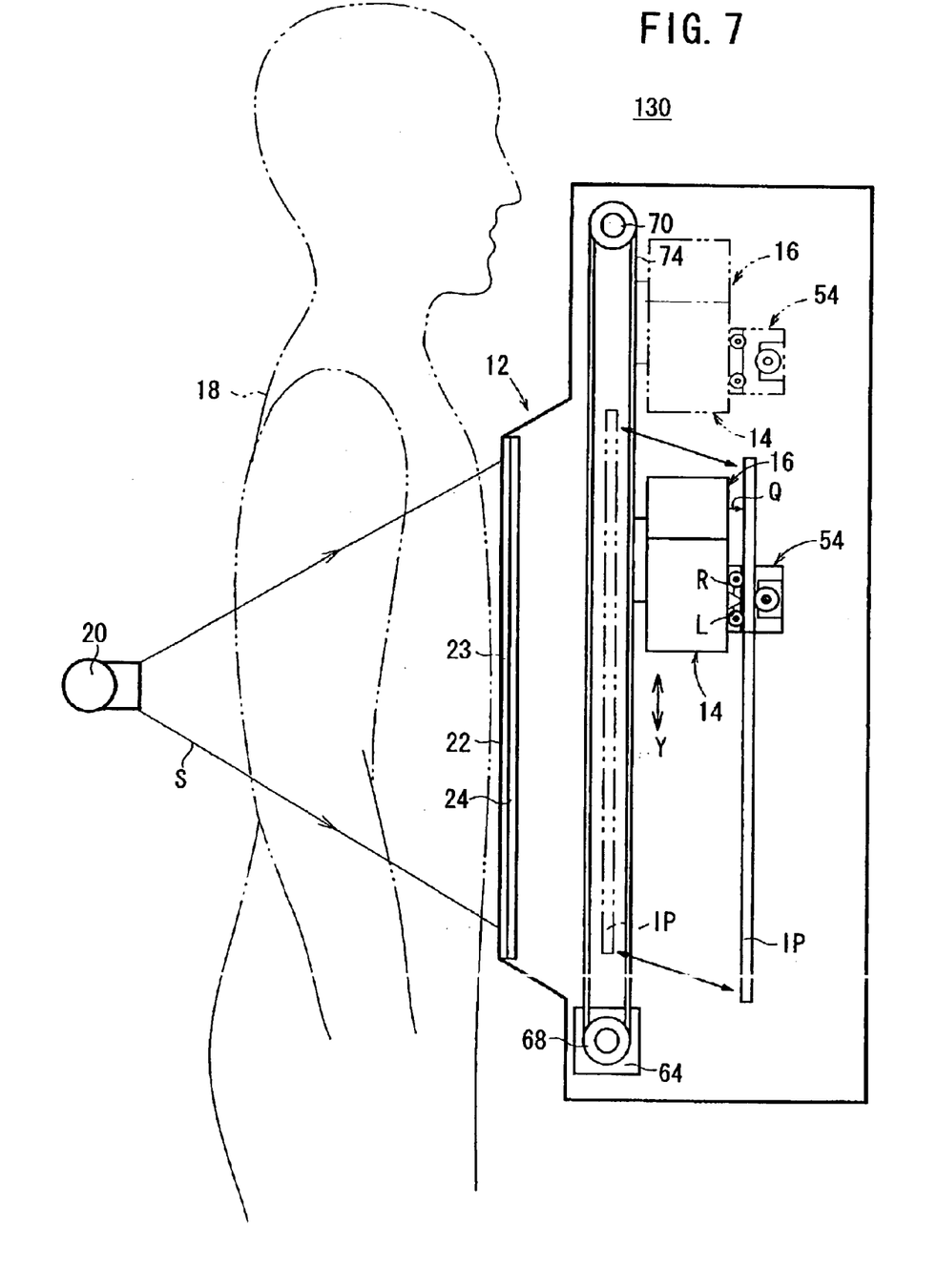
FIG. 7 is a schematic cross-sectional view of a radiation image information recording and reading apparatus according to a fourth embodiment of the present invention.

FIG. 7 shows in schematic cross section of a radiation image information recording and reading apparatus 130 according to a fourth embodiment of the present invention.

As shown in FIG. 7, in the radiation image information recording and reading apparatus 130, the stimulable phosphor sheet IP is movable by a moving mechanism, not shown, in the directions indicated by the arrows between an imaging position indicated by the two-dot-and-dash lines and a reading position indicated by the solid lines. The reading unit 14 and the erasing light source 16 are integrally combined with each other and mounted on the belt 74.

According to the fourth embodiment, before the radiation image information of the subject 18 is recorded on the stimulable phosphor sheet IP is placed in the imaging position indicated by the two-dot-and-dash lines shown in FIG. 7, and the reading unit 14 and the erasing light source 16 are located in an upper end of the radiation image information recording and reading apparatus 130.

When the recording of the radiation image information of the subject 18 in the stimulable phosphor sheet IP is finished, the stimulable phosphor sheet IP is moved from the imaging position indicated by the two-dot-and-dash lines to the reading position indicated by the solid lines, and the rotary actuator 64 is energized. The reading unit 14 and the erasing light source 16 are lowered in the direction indicated by the arrow Y, starting to read the radiation image information recorded in the stimulable phosphor sheet IP.

When the reading of the recorded radiation image information is completed, the reading unit 14 and the erasing light source 16 are lifted in the direction indicated by the arrow Y, and the erasing light source 16 is energized to cause the stimulable phosphor sheet IP to discharge remaining radiation energy therefrom. The stimulable phosphor sheet IP is now readied for recording radiation image information in a next cycle.

Figure 8:
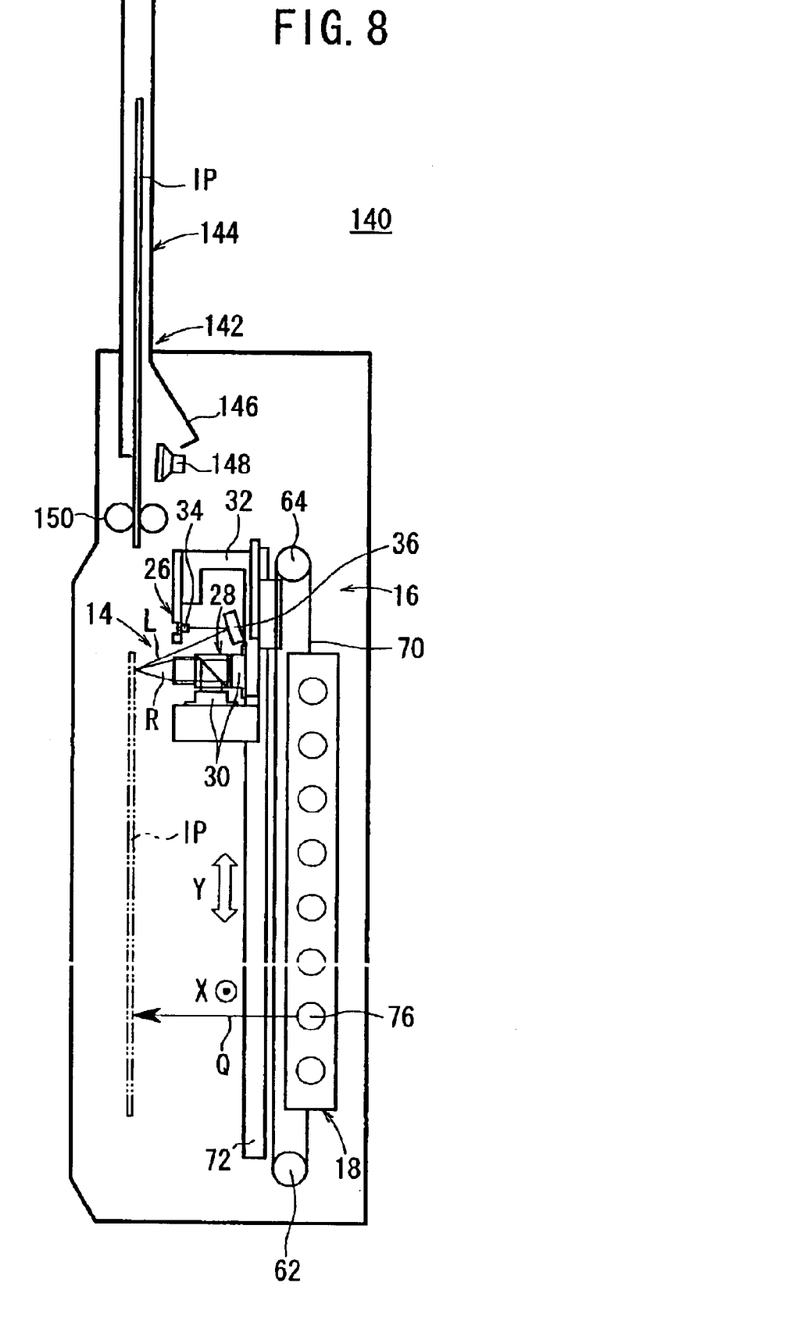
FIG. 8 is a schematic cross-sectional view of a radiation image information reading apparatus according to a fifth embodiment of the present invention.

FIG. 8 shows in schematic cross section of a radiation image information reading apparatus 140 according to a fifth embodiment of the present invention.

As shown in FIG. 8, the radiation image information reading apparatus 140 has a cassette loader 142 in an upper region thereof for loading therein a cassette 144 which has an openable and closable lid 146 in its lower portion. The cassette 144 can store a stimulable phosphor sheet IP therein.

The cassette loader 142 has a lid opening mechanism (not shown) for opening and closing the openable and closable lid 146, a suction cup 148 for removing the stimulable phosphor sheet IP from the cassette 144 while the openable and closable lid 146 is open and returning the stimulable phosphor sheet IP into the cassette 144 after the recorded radiation image information has been read therefrom, and feed rollers 150 for moving the stimulable phosphor sheet IP in the directions indicated by the arrows Y.

According to the fifth embodiment, the stimulable phosphor sheet IP stores therein radiation image information which has been recorded by a separate radiation image information recording apparatus (not shown). The cassette 144 which houses the stimulable phosphor sheet IP therein is loaded in the cassette loader 142, and the openable and closable lid 146 is opened in the cassette loader 142.

The stimulable phosphor sheet IP is removed from the cassette 144 by the suction cup 148. The stimulable phosphor sheet IP is gripped by the feed rollers 150, which are rotated to feed the stimulable phosphor sheet IP downwardly to a reading position.

In the reading position, the radiation image information recorded in the stimulable phosphor sheet IP is read by the reading unit 14. After the recorded radiation image information is read, the erasing light source 16 is energized to discharge remaining radiation energy from the stimulable phosphor sheet IP. The stimulable phosphor sheet IP is then fed upwardly by the feed rollers 150, and returned into the cassette 144 by the suction cup 148.

In the image information reading apparatus according to the present invention, since the depth of field of the stimulable phosphor sheet is maintained highly accurately in the desired range along the reading line, the recorded radiation image information can be read efficiently with high accuracy from the stimulable phosphor sheet. Inasmuch as the entire image information recording area of the stimulable phosphor sheet is not required to be positioned highly accurately at one time, the position restricting mechanism for positionally restricting the stimulable phosphor sheet is relatively simple in structure.

Although certain preferred embodiments of the present invention have been shown and described in detail, it should be understood that various changes and modifications may be made therein without departing from the scope of the appended claims.

What is claimed is:

1. An image information reading apparatus comprising:
   a reading unit for applying stimulating light in a main direction to a stimulable phosphor sheet which stores radiation image information of a subject, and reading, with a line sensor, light which is emitted from said stimulable phosphor sheet in response to the stimulating light; and
   a scanning system for feeding said reading unit in an auxiliary direction which is substantially perpendicular to said main direction;
   said reading unit having a position restricting mechanism which is positioned closely to a reading line along which the radiation image information stored in said stimulable phosphor sheet is read by said line sensor, said position restricting mechanism being capable of supporting said stimulable phosphor sheet along said main direction.

2. An image information reading apparatus according to claim 1, wherein said position restricting mechanism comprises at least a roller or a guide member with a damping shoe.

3. An image information reading apparatus according to claim 1, wherein said position restricting mechanism is made of a material more rigid than said stimulable phosphor sheet.

4. An image information reading apparatus according to claim 1, wherein the radiation image information is recorded in and read from said stimulable phosphor sheet and remaining radiation image information is erased from said stimulable phosphor sheet, repeatedly while said stimulable phosphor sheet is loaded in the image information reading apparatus.

5. An image information reading apparatus according to claim 1, further comprising:
   a cassette loader for removably loading therein a cassette which stores said stimulable phosphor sheet therein.

6. An image information reading apparatus according to claim 5, wherein said cassette has an openable and closable lid for taking said stimulable phosphor sheet into and out of said cassette, said cassette loader being arranged to load said cassette therein with said openable and closable lid disposed in a lower portion thereof.

7. An image information reading apparatus comprising:
   a reading unit for applying stimulating light in a main direction to a stimulable phosphor sheet which stores radiation image information of a subject, and reading, with a line sensor, light which is emitted from said stimulable phosphor sheet in response to the stimulating light; and a scanning system for feeding said stimulable phosphor sheet or said reading unit in an auxiliary direction which is substantially perpendicular to said main direction;

said reading unit having a position restricting mechanism which is positioned closely to a reading line alone which the radiation image information stored in said stimulable phosphor sheet is read by said line sensor, said position restricting mechanism being capable of supporting said stimulable phosphor sheet along said main direction, wherein said position restricting mechanism comprises:

first rubber rollers rotatably disposed one on each side of said reading line in said auxiliary direction; and a second rubber roller rotatably disposed in alignment with said reading line for contact with a surface of said stimulable phosphor sheet which is irradiated with a radiation to record the radiation image information therein.

8. An image information reading apparatus comprising:

a reading unit for applying stimulating light in a main direction to a stimulable phosphor sheet which stores radiation image information of a subject, and reading, with a line sensor, light which is emitted from said stimulable phosphor sheet in response to the stimulating light; and a scanning system for feeding said stimulable phosphor sheet or said reading unit in an auxiliary direction which is substantially perpendicular to said main direction;

said reading unit having a position restricting mechanism which is positioned closely to a reading line along which the radiation image information stored in said stimulable phosphor sheet is read by said line sensor, said position restricting mechanism being capable of supporting said stimulable phosphor sheet along said main direction, wherein said position restricting mechanism comprises:

first rubber rollers rotatably disposed one on each side of said reading line in said auxiliary direction; and a guide member disposed in alignment with said reading line for contact with a surface of said stimulable phosphor sheet which is irradiated with a radiation to record the radiation image information therein, said guide member having a damping shoe.

9. An image information reading apparatus comprising:

a reading unit for applying stimulating light in a main direction to a stimulable phosphor sheet which stores radiation image information of a subject, and reading, with a line sensor, light which is emitted from said stimulable phosphor sheet in response to the stimulating light;

a scanning system for feeding said stimulable phosphor sheet or said reading unit in an auxiliary direction which is substantially perpendicular to said main direction;

a feed mechanism for feeding said reading unit in said auxiliary direction; and a damper mechanism for resiliently supporting said stimulable phosphor sheet, said reading unit having a position restricting mechanism which is positioned closely to a reading line alone which the radiation image information stored in said stimulable phosphor sheet is read by said line sensor, said position restricting mechanism being capable of supporting said stimulable phosphor sheet along said main direction.

10. An image information reading apparatus according to claim 9, further comprising:

an erasing light source for erasing remaining radiation image information from said stimulable phosphor sheet;

said feed mechanism comprising means for feeding said erasing light source in unison with said reading unit.

11. An image information reading apparatus comprising:

a scanner unit comprising a stimulating system for applying stimulating light in a main direction to a stimulable phosphor sheet which stores radiation image information of a subject, and a sensor system for reading light which is emitted from the stimulable phosphor sheet in response to the stimulating light;

a scanning system for feeding the scanner unit in an auxiliary direction which is substantially perpendicular to the main direction;

a first restricting mechanism comprising a plurality of resilient members for supporting in the main direction the stimulable phosphor sheet on transversely opposite sides of the stimulable phosphor sheet; and a second restricting mechanism which is positioned closely to a reading line along which the radiation image information stored in the stimulable phosphor sheet is read, wherein the second position restricting mechanism supports the stimulable phosphor sheet along the main direction, and wherein the scanner unit and the second restricting mechanism are integrally mounted on a scanner head.

12. The image information reading apparatus of claim 11, wherein the resilient members are one of coil springs, leaf springs and rubber members.

13. The image information reading apparatus of claim 11, wherein the second restricting mechanism comprises first rollers rotatably disposed at least one on each side of the reading line in the auxiliary direction; and a second roller rotatably disposed in alignment with the reading line.

14. The image information reading apparatus of claim 13, wherein the first and second rollers extend substantially the full width of the stimulable phosphor sheet in the main direction, and wherein the second roller is disposed on the opposite side of the stimulable phosphor sheet as the first rollers.

15. The image information reading apparatus of claim 11, wherein the second restricting mechanism comprises a plurality of rollers rotatably disposed at least one on each side of the reading line in the auxiliary direction; and a guide member with a damping shoe disposed in alignment with the reading line.

16. The image information reading apparatus of claim 15, wherein the rollers and the guide member extend substantially the full width of the stimulable phosphor sheet in the main direction, and wherein the guide member is disposed on the opposite side of the stimulable phosphor sheet as the rollers.

17. The image information reading apparatus of claim 11, wherein the second restraining mechanism positions the stimulable phosphor sheet to maintain the depth of field of the sensor system.

* * * * *